No. 655,441. Patented Aug. 7, 1900.
W. JAMIESON.
SECTIONAL FLOATING DOCK.
(Application filed Apr. 13, 1899. Renewed Dec. 26, 1899.)
(No Model.) 3 Sheets—Sheet 1.
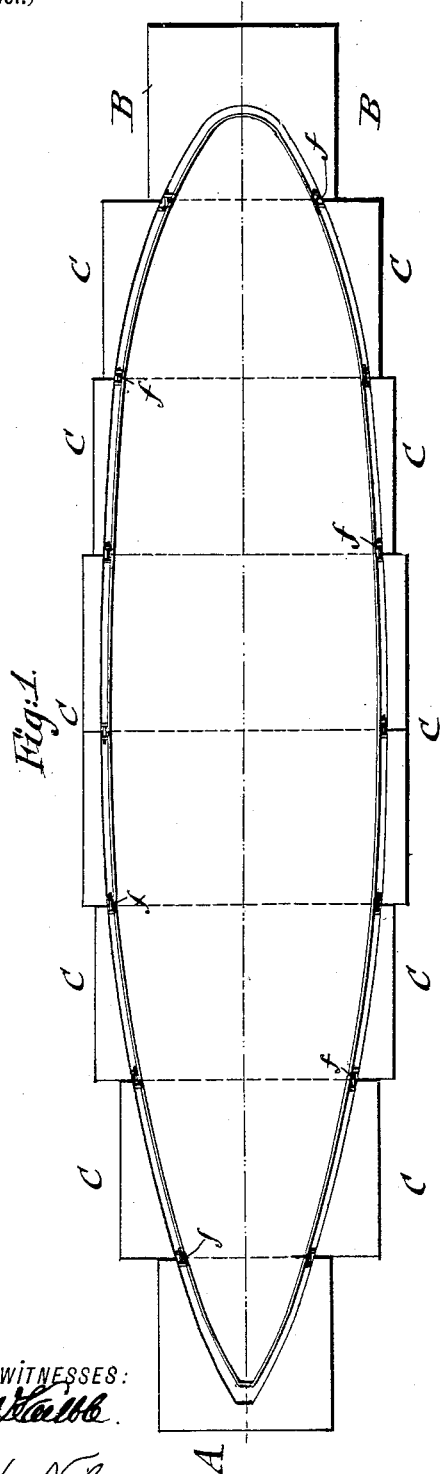
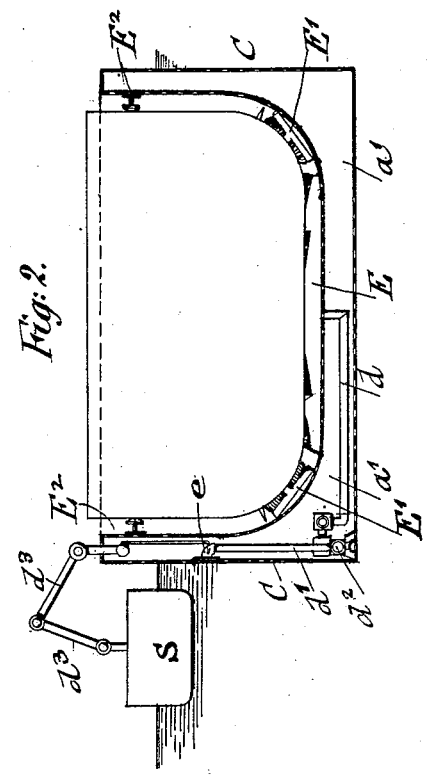
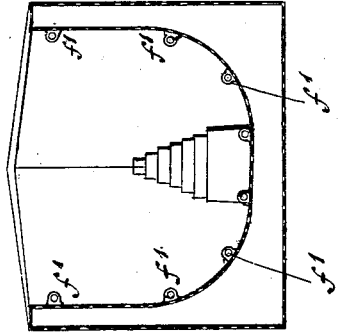
WITNESSES:
INVENTOR
Walter Jamieson
BY
ATTORNEYS.

No. 655,441. Patented Aug. 7, 1900.
W. JAMIESON.
SECTIONAL FLOATING DOCK.
(Application filed Apr. 13, 1899. Renewed Dec. 26, 1899.)
(No Model.) 3 Sheets—Sheet 2.
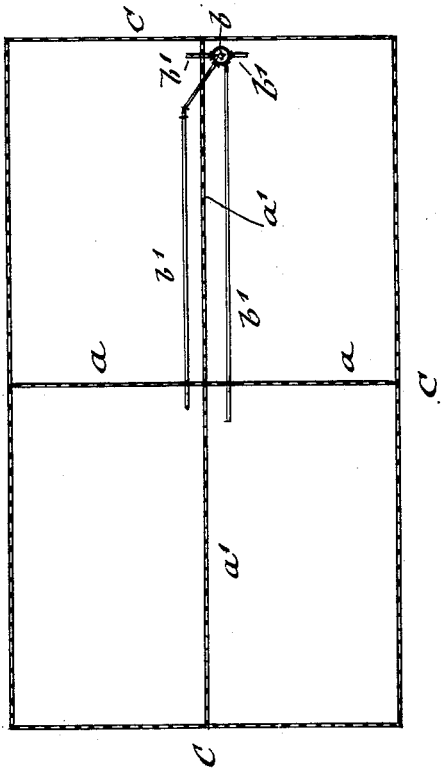
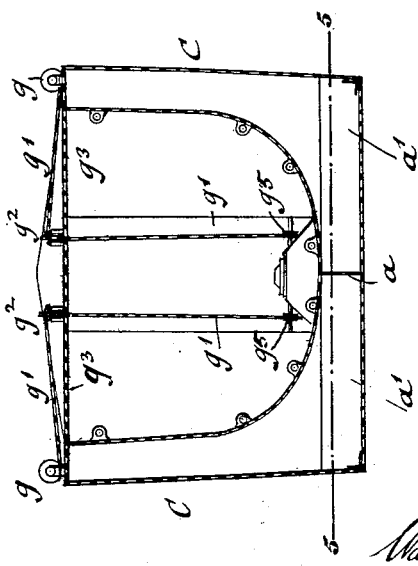
WITNESSES:
INVENTOR
Walter Jamieson
BY
ATTORNEYS.

No. 655,441. Patented Aug. 7, 1900.
W. JAMIESON.
SECTIONAL FLOATING DOCK.
(Application filed Apr. 13, 1899. Renewed Dec. 26, 1899.)
(No Model.) 3 Sheets—Sheet 3.
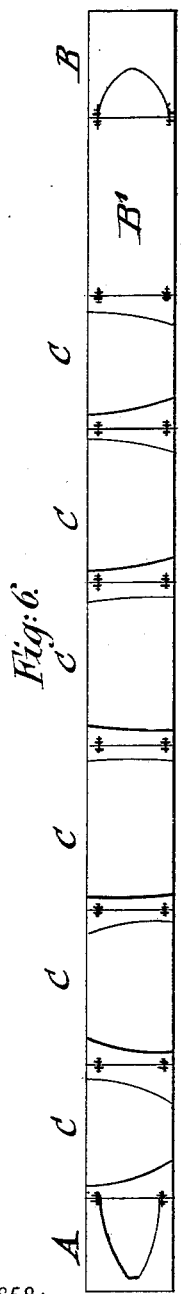
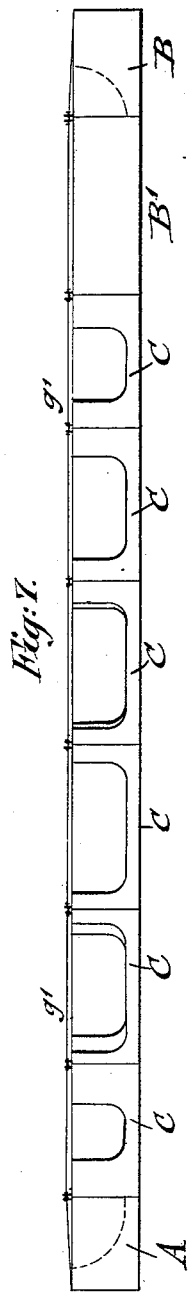
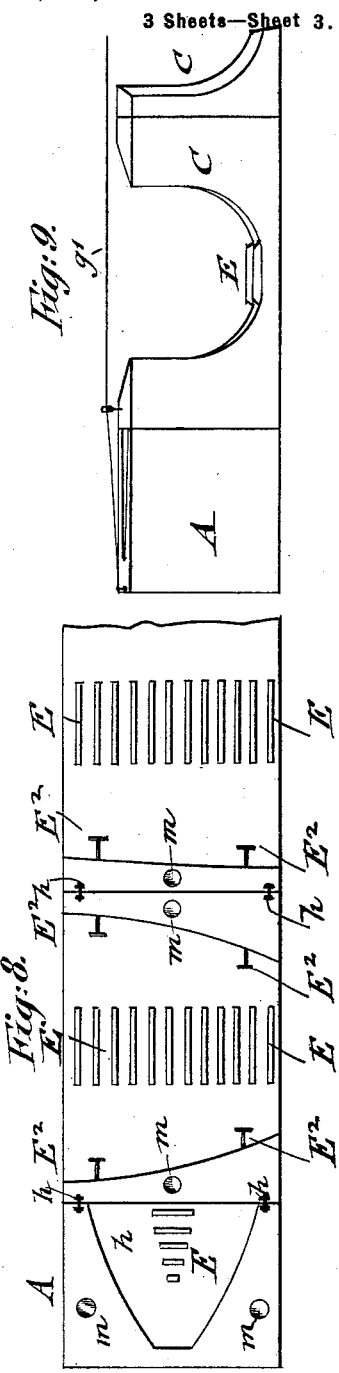
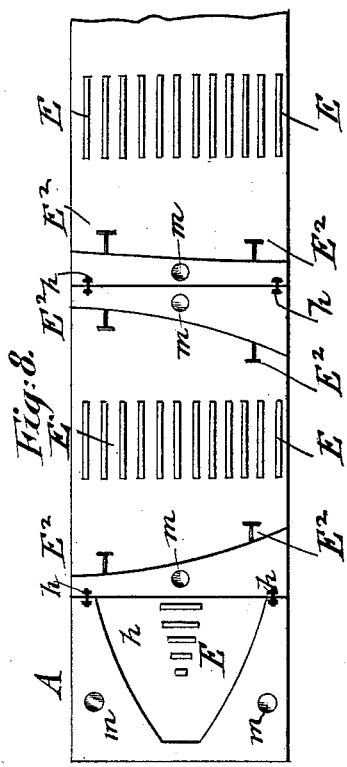
WITNESSES:
INVENTOR
Walter Jamieson
BY
ATTORNEYS.

UNITED STATES PATENT OFFICE.

WALTER JAMIESON, OF NEW YORK, N. Y.

SECTIONAL FLOATING DOCK.

SPECIFICATION forming part of Letters Patent No. 655,441, dated August 7, 1900.

Application filed April 13, 1899. Renewed December 26, 1899. Serial No. 741,675. (No model.)

*To all whom it may concern:*

Be it known that I, WALTER JAMIESON, a citizen of the United States, residing in the city of New York, in the borough of Brooklyn and State of New York, have invented certain new and useful Improvements in Sectional Floating Docks, of which the following is a specification.

This invention has reference to certain improvements in sectional floating docks, which is not constructed in the form of a stationary structure, but in sections that are adapted to be locked, so that the connected structure can be towed to the place of use and there applied to the vessels to be cleaned, so that men-of-war or other vessels can be cleaned and repaired at the places where they are stationed without being sent to a stationary drydock; and the invention consists of a sectional floating dock which is composed of a number of individual hollow sections corresponding in their total length to the length of the vessel to be repaired or cleaned, said individual sections being formed of steel plates and provided at their interior walls with keel and chock blocks. Each individual section of my improved dock is composed of interior and exterior walls connected by top and end walls, the walls of the section being joined together by angle irons and frames, while the interior shell is shaped according to the portion of the hull to which it is to be applied. The bow and stern sections, as well as the intermediate sections, are provided with bottom partitions and with valves and pipes for pumping the water from said sections and from the spaces between the inner shells and the hull of the vessel supported therein. Two-thirds of the sections are connected together by suitable locking devices from the bow-section aft, while the remaining third of the sections are bolted together from the stern-section forward, after which they are submerged sufficiently for being placed in position on the vessel. The sections are also provided with means for locking them side by side in line with each other for the purpose of towing them to the place of use.

The invention consists, further, of certain additional accessories required for the proper functioning of my improved floating dock, as will be fully described hereinafter and finally pointed out in the claims.

In the accompanying drawings, Figure 1 represents a plan view of my improved sectional floating dock, showing it as applied to the hull of a vessel. Fig. 2 is a vertical transverse section through one of the intermediate sections of the floating dock, shown in connection with a scow on which the pumps are placed for pumping out the water from each dock-section. Fig. 3 is an elevation of the bow-section, taken from the inside end. Fig. 4 is a similar elevation of the stern-section. Fig. 5 is a horizontal section on line 5 5 of Fig. 4, drawn on a larger scale and showing the partitions in the lower part of the section and the valved pipes for pumping the water from each compartment formed by the partitions. Figs. 6 and 7 are respectively a plan and a side elevation of my improved sectional floating dock, showing the sections locked together side to side, so as to be towed to the place of use. Fig. 8 is a plan of the bow-sections of the dock, and Fig. 9 is a perspective view of the same, both Figs. 8 and 9 being drawn on a larger scale than Figs. 6 and 7.

Similar letters of reference indicate corresponding parts.

My improved floating dock is composed of a number of sections—a bow-section A, a stern-section B, and a number of intermediate sections C. The intermediate sections C increase in width according to the increasing width of the hull of the vessels and are constructed of steel plates of sufficient strength, each section forming an entirely-closed structure that floats easily in the water. The interior shell of each dock-section corresponds in shape with the general contour of that part of the hull to which the section is applied when in use, while the outer shell is rectangular, the outer and inner shells being connected by end and top and bottom walls, so as to form a hermetically-closed section. Each section A, B, or C is provided at the lower part with a longitudinal and a transverse partition $a\ a'$ of less height than the distance between the lower parts of the inner and outer shells, so that open compartments are formed of about two feet or more in height, which may be filled with water, that acts in the nature of a ballast, so as to level the sections relatively to each other, so that they can be readily connected together. A vertical suction-pipe $b$ is arranged near the side walls of the shells, said suction-pipe being connected by valved pipes $b'$ with each compartment, as shown in Fig. 5, so that the water can be pumped out of any compartment whenever required. Each section is further provided with a suction-pipe $d$, that connects an opening in the bottom of the inner shell with a lift-pipe $d'$, which is connected with a pump, pulsometer, or ejector, said lift-pipe being also provided below the suction-pipe $d$ with a stop-cock $d^2$, so that not only the water in the space between the interior shell of the floating sections and the vessel docked therein can be pumped out, but also the water from the bottom compartments of each section. The steam required for operating the pump, pulsometer, or ejector $e$ is furnished by a steam-boiler on board of a scow S, the suction-pipe of the pump or ejector being connected, by means of jointed pipe-sections $d^3$, with the suction-port of the pump on board of the scow S or with the suction-pipe of the ejector. Each dock-section is provided with a central keel-block E, a chock-block E' at each side of the same, and with supporting-braces E² at the upper parts of the inner shell, as shown in Fig. 2, so that the vessel to be repaired or cleaned is firmly supported on the keel-blocks, chock-blocks, and side braces when the floating dock-sections are placed in position and the water pumped out of the interior of the same without danger of straining the hull. The abutting end walls of the adjacent sections are connected by means of bolts $f$, which are passed through eyes $f'$, arranged on the inner shells near the ends of the same, the bolts producing the tight locking together of the end walls of the sections.

For the purpose of connecting and locking the sections together they are bolted together end to end, two or three stern-sections being left off to be connected later after the vessel is in the forward sections.

A certain quantity of water is allowed to enter into the bottom compartments of each section, so as to level the section sufficiently to permit its connection with the adjacent sections. The stern-section is provided at its top with winding-drums $g$ for wire ropes or cables $g'$, which are guided over pulleys $g^2$, supported on transverse braces $g^3$, connecting the top part of said section, the wire ropes passing from said pulleys $g^2$ in downward direction to pulleys $g^5$ near the keel-block and from the same over pulleys on the adjacent stern section or sections to rings on the rearmost intermediate sections, to which they are applied by hooks, so that on turning the winding-drums the cables are wound up on the drums and the stern-section moved up onto the hull ready for being bolted to the rearmost intermediate section.

When it is desired to apply my improved sectional floating dock to a vessel, the bow-section is connected with an intermediate section and then one intermediate section to the other until their length is about equal to two-thirds the length of the vessel. They are then submerged sufficiently by permitting water to enter to the interior of the sections and then towed under the vessel until the bow-section arrives in position at the bow of the vessel. One or more rear sections and the stern-section are then bolted together, submerged in the same manner, towed under the vessel, and connected with the rearmost section by means of the cables and finally bolted to the rearmost section around the vessel to be scraped or repaired. The water is next pumped out of the space between the floating sections and the hull, so that the vessel gradually settles on the keel-blocks, chock-blocks, and side braces, the water remaining in the sections, so as to make the dock steady and strong. The hull is then cleaned or repaired in the usual manner. When this is done, the water is permitted to enter again into the space between the dock-sections and the vessel, the stern-sections being then removed, likewise the bow and intermediate sections, so that the dock is ready for the next vessel to be docked. In this way a man-of-war or other vessel can be cleaned without leaving her station and without going to a stationary dry-dock, the floating dock being towed to the place where the vessels are stationed.

For the purpose of floating the dock to the place where it is to be used the individual sections are connected in line with each other at their side walls, so as to form one connected structure, as shown in Figs. 6 and 7. For the purpose of permitting this connection the length of each intermediate section has to be equal to the width of the stern and bow sections, so that when the sections are connected at their sides a structure of uniform width is obtained.

With the dock-sections A, B, and C is used an auxiliary section B', which serves as a caisson to be used in connection with some of the intermediate sections and either the bow or stern section, so as to form a dry-dock or pound with these sections when it is necessary to dock any one of the sections for cleaning, painting, or repairing the same. The auxiliary section B' can also be used for wrecking purposes in case of need, it forming a powerful pneumatic lift, being thus an important auxiliary to the floating dock. The auxiliary section B' is attached in front of the stern-section and bolted to the same and the next preceding intermediate section, said stern-section being preferably provided with a rudder, (not shown in the drawings,) so as to steer the connected floating sections when they are towed from place to place. The floating sections are tied together by means of cables $g'$, before described, that are extended over the tops and bottoms of the same, and locked by means of bolts $h$, applied to the adjacent top and bottom portions of said sections. All the sections are provided with manholes $m$ at their tops and with steps at the interior side walls, so that the attendants can enter to the interior of the sections and operate the valves, connect the sections, &c., whenever it is necessary to admit water to the sections, or for pumping water out of the same or from the space between the sections, as the case may be.

The advantage of my improved sectional floating dock is that it can be moved to the place where the vessel is to be cleaned or repaired instead of sending the vessel to a drydock at certain distant points on the coast. In other words, the dock follows the vessels, which is of great advantage to men-of-war that are stationed in foreign waters, so that they are not required to return for docking. By my improved sectional floating dock a very convenient means is obtained by which vessels can be repaired and cleaned at a considerable distance from their home country, especially because of the facility by which the floating sections can be connected together and towed to the place of use.

Having thus described my invention, I claim as new and desire to secure by Letters Patent—

1. A sectional floating dock, consisting of bow and stern sections conforming at their interior walls respectively with the shape of the bow and stern of a vessel, said sections having closed outer ends, and intermediate sections, each of said intermediate sections conforming approximately in shape at its interior wall to the shape of the portion of the hull to which it is applied, substantially as set forth.

2. A sectional floating dock consisting of hermetically-closed bow and stern sections, said sections having closed outer ends, and a number of intermediate sections, each section being composed of an exterior and an interior shell, the latter adapted to conform to the shape of that portion of the hull to which it is to be applied, said sections being provided with the usual keel-blocks, chock-blocks and side supports or braces, and with partitions in their bottom portions forming compartments, and means for locking the sections together when applied to the vessel, substantially as set forth.

3. A sectional floating dock, consisting of a number of sections corresponding at their inner surface with the shape of that portion of the hull to which they are to be applied, said sections being composed of closed exterior and interior shells, locking devices for connecting the ends of the sections when applied to the hull of a vessel, longitudinal and transverse partitions forming compartments in the bottom part of each section, and valved pipes for admitting or removing the water from said sections and from the space between them and the vessel docked in the same, substantially as set forth.

4. A sectional floating dock, consisting of bow and stern sections closed at their outer ends and of equal width, and a number of intermediate sections, the length of each of said intermediate sections being equal to the width of said bow and stern sections, and means for connecting all of said sections together with the sides of the intermediate sections abutting against each other and with the bow and stern sections arranged respectively at the ends of the line of intermediate sections, substantially as set forth.

5. In a sectional floating dock, the combination, with the bow and stern sections having closed outer ends, and intermediate sections, the interior shells of which are shaped to correspond with the portions of the hull to which they are to be applied, of an auxiliary closed section, and means for locking the sections together so as to form a pound for any individual section, substantially as set forth.

6. In a sectional floating dock, an individual dock-section composed of hermetically-closed exterior and interior shells provided with the usual keel-blocks, chock-blocks and side braces, longitudinal and transverse partitions forming compartments in the lower part of said dock-section, means for admitting or removing water from the interior of said section, and means for removing the water from the space at the interior of the inner shell, substantially as set forth.

In testimony that I claim the foregoing as my invention I have signed my name in presence of two subscribing witnesses.

WALTER JAMIESON.

Witnesses:
PAUL GOEPEL,
J. H. NILES.